US 8,375,456 B2

(12) United States Patent
Li et al.

(10) Patent No.: US 8,375,456 B2
(45) Date of Patent: Feb. 12, 2013

(54) DIGITAL RIGHTS MANAGEMENT SCHEME FOR AN ON-DEMAND DISTRIBUTED STREAMING SYSTEM

(75) Inventors: Jin Li, Sammamish, WA (US); Yi Cui, Urbana, IL (US)

(73) Assignee: Microsoft Corp., Redmond, WA (US)

( * ) Notice: Subject to any disclaimer, the term of this patent is extended or adjusted under 35 U.S.C. 154(b) by 258 days.

(21) Appl. No.: 12/616,917

(22) Filed: Nov. 12, 2009

(65) Prior Publication Data

US 2010/0115628 A1    May 6, 2010

Related U.S. Application Data

(60) Division of application No. 11/078,926, filed on Mar. 12, 2005, now Pat. No. 7,639,805, which is a continuation-in-part of application No. 10/934,823, filed on Sep. 3, 2004, now Pat. No. 7,664,109.

(51) Int. Cl.
*G06F 21/00* (2006.01)

(52) U.S. Cl. .............................. 726/28; 713/193; 705/57

(58) Field of Classification Search .................. 726/2–5, 726/26–28; 713/151, 152, 166, 189, 193, 713/168, 170, 179; 380/200, 210, 258, 255, 380/259; 705/50, 57–59; 709/230, 231
See application file for complete search history.

(56) References Cited

U.S. PATENT DOCUMENTS

| | | | | |
|---|---|---|---|---|
| 6,185,680 | B1 * | 2/2001 | Shimbo et al. ................ | 713/160 |
| 6,424,714 | B1 * | 7/2002 | Wasilewski et al. .......... | 380/200 |
| 6,868,495 | B1 * | 3/2005 | Glover .......................... | 713/190 |
| 7,213,047 | B2 * | 5/2007 | Yeager et al. ................. | 709/202 |
| 7,277,548 | B2 * | 10/2007 | Park et al. ..................... | 380/270 |
| 7,698,555 | B2 * | 4/2010 | Jiang et al. .................... | 713/168 |
| 2004/0015586 | A1 * | 1/2004 | Hegli et al. ................... | 709/225 |
| 2004/0141613 | A1 * | 7/2004 | Hayashi ......................... | 380/28 |
| 2004/0174999 | A1 * | 9/2004 | Iwamura et al. .............. | 380/277 |
| 2004/0250072 | A1 * | 12/2004 | Ylonen ......................... | 713/170 |
| 2005/0138379 | A1 * | 6/2005 | Semple et al. ................ | 713/170 |
| 2005/0144468 | A1 * | 6/2005 | Northcutt et al. ............. | 713/189 |
| 2005/0172309 | A1 * | 8/2005 | Risan et al. ..................... | 725/1 |
| 2005/0276416 | A1 * | 12/2005 | Zhu et al. ...................... | 380/210 |
| 2006/0041655 | A1 * | 2/2006 | Holloway et al. ............. | 709/223 |
| 2006/0090082 | A1 * | 4/2006 | Apostolopoulos ............ | 713/189 |

\* cited by examiner

*Primary Examiner* — Gilberto Barron, Jr.
*Assistant Examiner* — Abdulhakim Nobahar
(74) *Attorney, Agent, or Firm* — Lyon & Harr, LLP; Katrina A. Lyon

(57) ABSTRACT

A DRM scheme that may be optionally invoked by the owner. With the DRM protection turned on, the media is encrypted before it is distributed in a P2P network, and is decrypted prior to its use (play back). The peers may still efficiently distribute and serve without authorization from the owner. Nevertheless, when the media is used (played back), the client node must seek proper authorization from the owner. The invention further provides a hierarchical DRM scheme wherein each packet of the media is associated with a different protection level. In the hierarchical DRM scheme of the invention there is usually an order of the protection level. As a result, in one embodiment of the invention, the decryption key of a lower protection layer is the hash of the decryption key at the higher protection level. That way, a user granted access to the high protection layer may simply hold a single license of that layer, and obtain decryption keys of that layer and below. The invention further provides for a process for managing digital rights to a scalable media file wherein a different encryption/decryption key is used to encrypt each truncatable media packet with a base layer without requiring additional storage space to store the key.

7 Claims, 10 Drawing Sheets

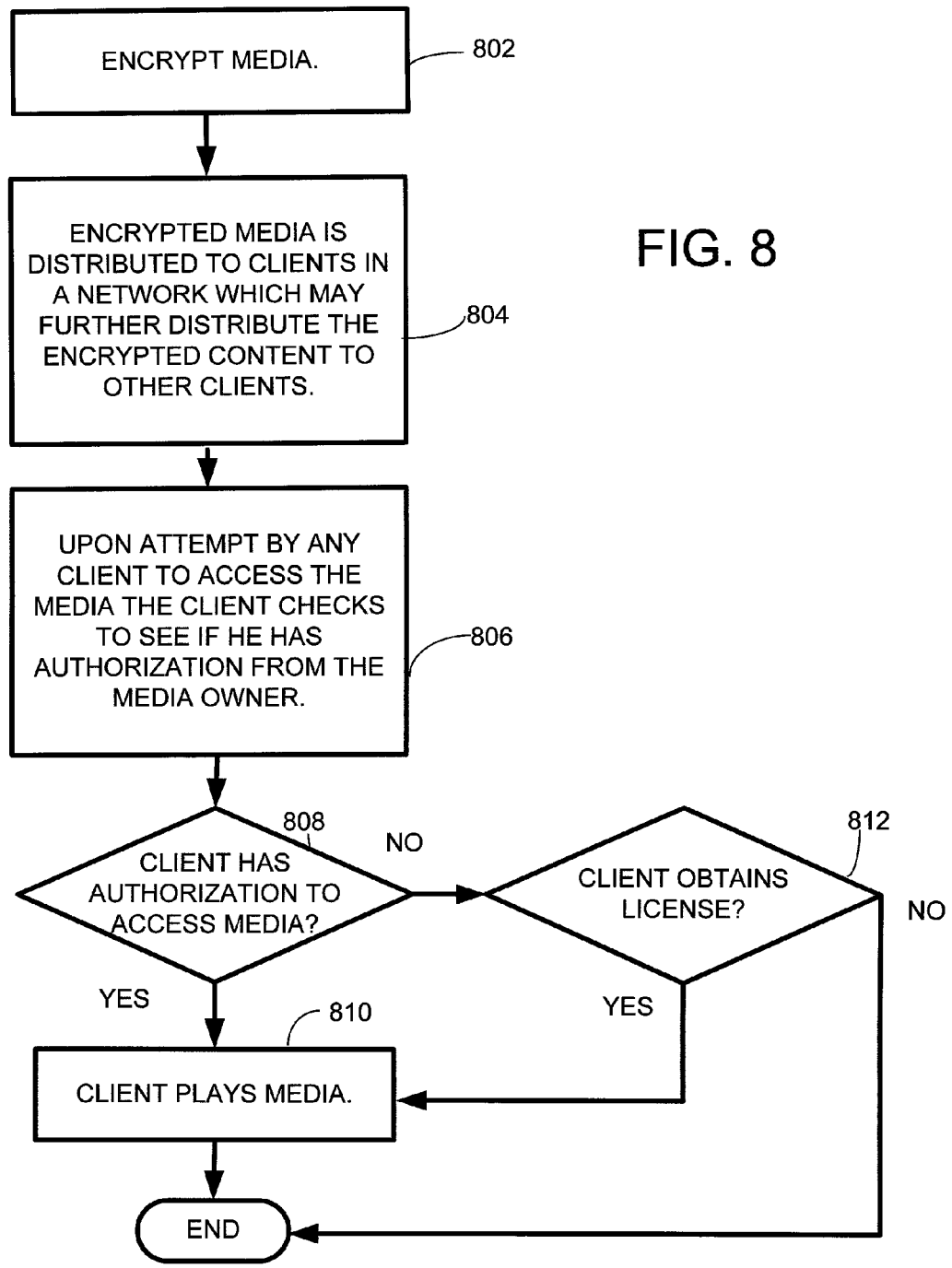

DIGITAL RIGHTS MANAGEMENT SCHEME FOR AN ON-DEMAND DISTRIBUTED STREAMING SYSTEM

CROSS REFERENCE TO RELATED APPLICATIONS

This application is a divisional application of U.S. patent application Ser. No. 11/078,926, filed on Mar. 12, 2005, now U.S. Pat. No. 7,639,805 entitled "A DIGITAL RIGHTS MANAGEMENT SCHEME FOR AN ON-DEMAND DISTRIBUTED STREAMING SYSTEM", which was a continuation-in-part of U.S. patent application Ser. No. 10/934,823, filed on Sep. 3, 2004, now U.S. Pat. No. 7,664,109 by Jin Li and entitled "A SYSTEM AND METHOD FOR DISTRIBUTED STREAMING OF SCALABLE MEDIA."

BACKGROUND

1. Technical Field

The invention is related to peer-to-peer (P2P) media streaming, and in particular, to digital rights management (DRM) schemes for use in on-demand distributed media streaming applications.

2. Related Art

According to the market research, over half of the Internet users in the United States have accessed some form of streaming media in 2004. Streaming music is still the most popular, but the popularity of streaming video is growing rapidly. Unlike web pages, a streaming media file is huge. A 3-minute movie trailer encoded at 2 megabits per second (Mbps) results in a 45 megabyte (MB) media file. Streaming media also carries stringent demands in the timing of packet delivery. The large size of the streaming media, as well as the delivery timing requirement, causes a streaming media server to be expensive to set up and run. Currently, the going wholesale rate for the network bandwidth is about $300 per Mbps per month, or $4,500 per annum for a leased T1 line (1.5 Mbps), $160,000 per annum for a leased T3 line (45 Mbps). The network bandwidth cost is a significant component of running a media server. The high bandwidth cost causes the media server today to serve mostly low bitrate, poor quality media.

The emergence of peer-to-peer (P2P) networks has revolutionized the way that media content is distributed. Popular P2P systems such as KaZaA and BitTorrent have attracted millions of users, and have efficiently distributed huge files. In such P2P networks, a peer node contributes resources, namely upload bandwidth and disk storage, in exchange for services from the other peers to improve its own content retrieval experience. Despite various hurdles, such as the presence of the leech nodes, copyright issues, virus and security concerns, P2P networks and systems flourish because users benefit from being able to retrieve content faster and more cheaply than directly retrieving the file from a server.

One challenge in a P2P network lies in the on demand streaming of media. Unlike watching TV, the user is accustomed to access the content in a non-sequential order on the Internet. The user likes the capability to fast forward or rewind the media the same way they operate their DVD or VCR player. However, many present data structures do not support this ability to randomly access streamed data in a P2P network.

Another challenge in a P2P network configuration is the issue of digital rights management (DRM). In many P2P networks, media content may be distributed without the owner's knowledge, proper authorization, and/or just compensation. This is an obstacle to the deployment of P2P content distribution systems, even though these systems may reduce the content delivery cost for the owner.

Therefore, what is needed is a system and method that enables segments of media to be read, written, accessed, and streamed in a non-sequential order. What is further needed is a DRM implementation that achieves efficient content distribution without relinquishing the control of the content.

SUMMARY

The system and method of the invention provides a Digital Rights Management (DRM) scheme that may be optionally invoked by the owner. With the DRM protection turned on, the media is encrypted before it is distributed in a Peer to Peer (P2P) network, and is decrypted prior to its use (play back). The peers may still efficiently distribute and serve without authorization from the owner. Nevertheless, when the media is used (played back), the client node must seek proper authorization from the owner. This DRM scheme of the invention thus achieves efficient content distribution without relinquishing the control of the content.

The invention further provides a hierarchical DRM scheme wherein each packet of the media is associated with a different protection level. In the hierarchical DRM scheme of the invention there is usually an order of the access or protection level. As a result, in one embodiment of the invention, the decryption key of a lower protection layer is the hash of the decryption key at the higher protection level. That way, a user granted access to the high protection layer may simply hold a single license of that layer, and obtain decryption keys of that layer and below.

DESCRIPTION OF THE DRAWINGS

The specific features, aspects, and advantages of the present invention will become better understood with regard to the following description, appended claims, and accompanying drawings where:

FIG. 8 provides an exemplary flow diagram of one embodiment of a DRM scheme according to the invention.

DETAILED DESCRIPTION OF THE PREFERRED EMBODIMENTS

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
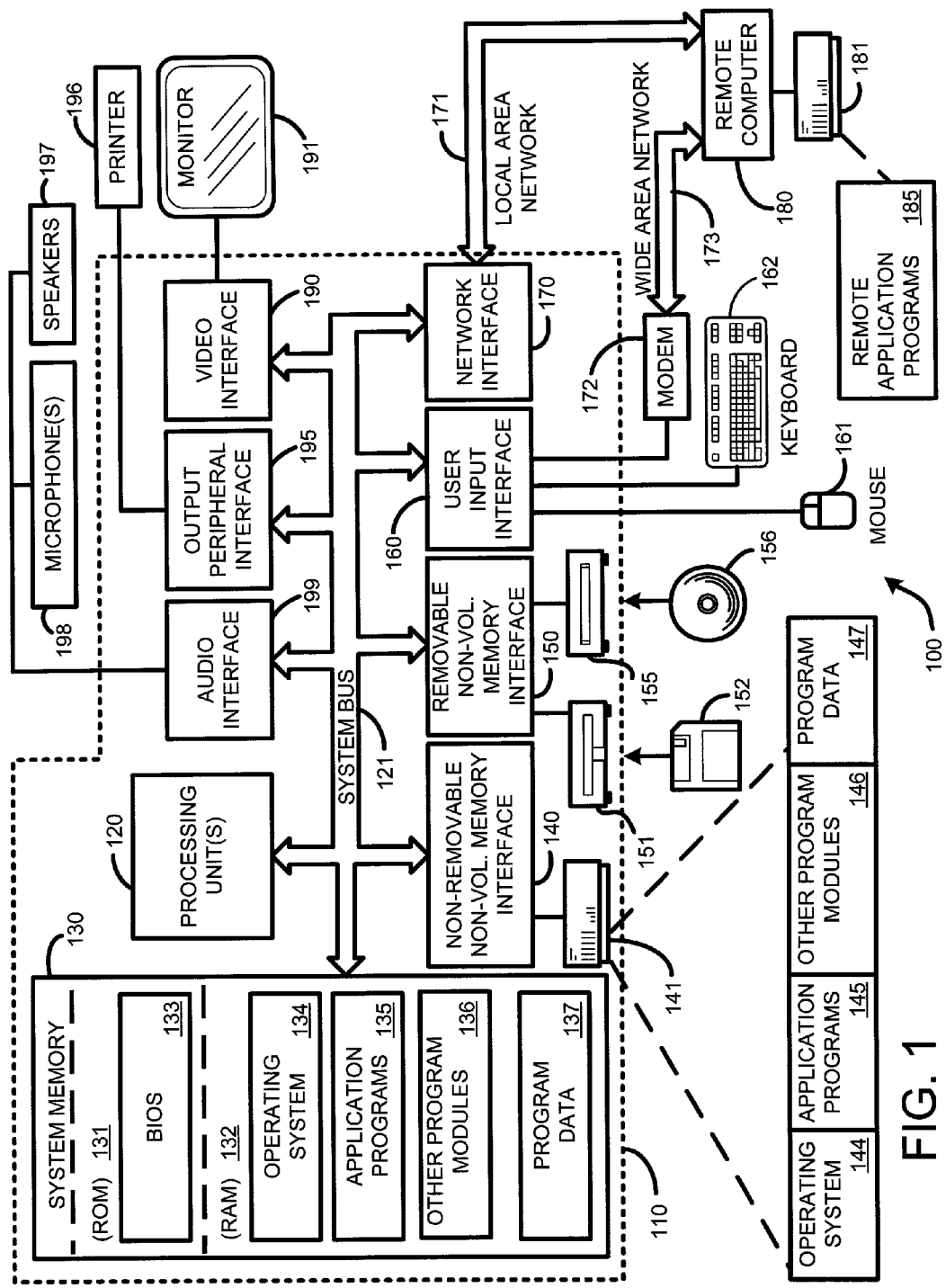
FIG. 1 is a general system diagram depicting a general-purpose computing device constituting an exemplary system wherein the random access read/write format and the DRM schemes of the invention can be practiced.

1.0 Exemplary Operating Environment:

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer in combination with hardware modules, including components of a microphone array 198. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general-purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile and non-removable media implemented in any method or technology for storage of information such as computer readable instructions, data structures, program modules, or other data.

Computer storage media includes, but is not limited to, RAM, ROM, PROM, EPROM, EEPROM, flash memory, or other memory technology; CD-ROM, digital versatile disks (DVD), or other optical disk storage; magnetic cassettes, magnetic tape, magnetic disk storage, or other magnetic storage devices; or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball, or touch pad.

Other input devices (not shown) may include a joystick, game pad, satellite dish, scanner, radio receiver, and a television or broadcast video receiver, or the like. These and other input devices are often connected to the processing unit 120 through a wired or wireless user input interface 160 that is coupled to the system bus 121, but may be connected by other conventional interface and bus structures, such as, for example, a parallel port, a game port, a universal serial bus (USB), an IEEE 1394 interface, a Bluetooth™ wireless interface, an IEEE 802.11 wireless interface, etc. Further, the computer 110 may also include a speech or audio input device, such as a microphone or a microphone array 198, as well as a loudspeaker 197 or other sound output device connected via an audio interface 199, again including conventional wired or wireless interfaces, such as, for example, parallel, serial, USB, IEEE 1394, Bluetooth™, etc.

A monitor 191 or other type of display device is also connected to the system bus 121 via an interface, such as a video interface 190. In addition to the monitor, computers may also include other peripheral output devices such as a printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description will be devoted to a discussion of an exemplary P2P architecture and a random access read/write media format and Digital Rights Management (DRM) scheme that can be employed in a peer-to-peer (P2P) network for distributed media streaming.

2.0 Exemplary P2P Architecture wherein the Random Access Read/Write Format and Digital Rights Management Scheme of the Invention May be Implemented:

By way of context, one exemplary P2P architecture in which the random access read/write data format and the Digital Rights Management (DRM) techniques of the invention can be practiced is described in co-pending U.S. patent application Ser. No. 10/934,823, filed on Sep. 3, 2004, by Jin Li and entitled "A SYSTEM AND METHOD FOR DISTRIBUTED STREAMING OF SCALABLE MEDIA". In this architecture a "Peer Streamer" provides receiver-driven peer-to-peer (P2P) media streaming for loosely coupled P2P networks. Like in many P2P networks, in the Peer Streamer architecture peers in the network perform only simple operations, may cache all or part of the streaming media, do not collaborate with other peers, may be unreliable, and may drop offline or come online during any given streaming session. Clients in the network operate in real-time to coordinate peers, stream media from multiple peers, perform load balancing, handle online/offline states of peers, and perform decoding and rendering the streaming media.

Figure 2:
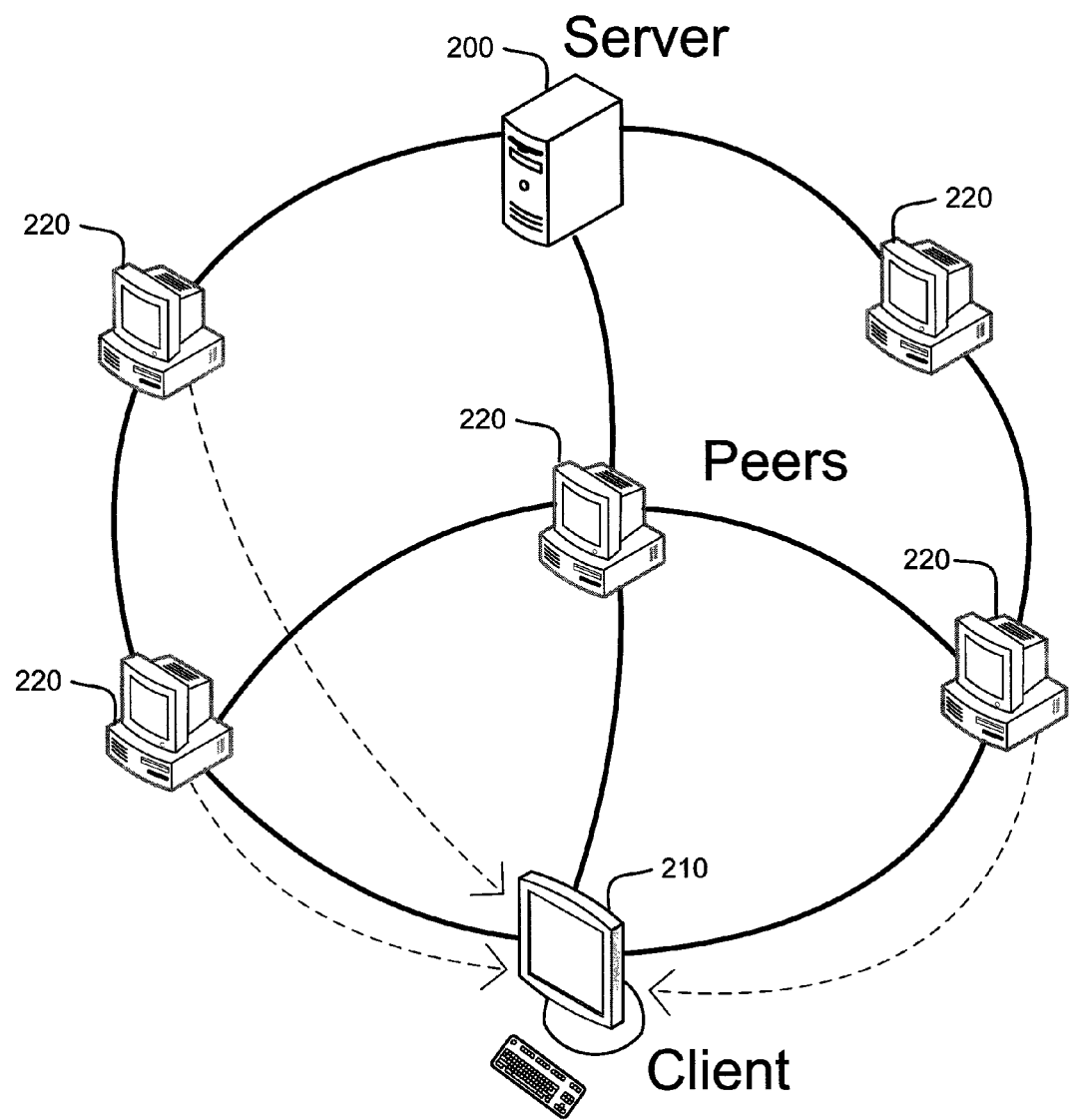
FIG. 2 illustrates an exemplary peer-to-peer (P2P) network for use with media streaming, and in which the random access read/write media format and DRM schemes of the invention can be employed.

In general, the PeerStreamer operates in a P2P network such as the network illustrated by FIG. 2. For a particular streaming session, a "server" 200 is defined as a node in the P2P network that initially originates the streaming media; a "client" (or receiver) 210 is defined as a node that currently requests the streaming media; and a "serving peer" 220 is defined as a node that serves the client with a complete or partial copy of the streaming media.

In general, the server 200, the client 210 and the serving peers 220 are all end-user nodes connected to a network such as the Internet. Because the server 200 is always capable of serving the streaming media, the server node also acts as a serving peer 220. The server node 200 can also perform media administrative functionalities that cannot be performed by a serving peer 220, e.g., maintaining a list of available serving peers, performing digital rights management (DRM) functionality, etc. In addition, as with conventional P2P schemes, the PeerStreamer system benefits from increased efficiency as more and more streaming peer nodes 220 are deployed. In particular, even as the number of streaming peer nodes 220 increases, the load on the media server 200 will not increase, therefore the cost of maintaining the server does not increase. Each client node 210 will also be able to receive better media quality than streaming directly from the server as the media can be retrieved from nearby peer nodes with better network connections.

In addition, it should be clear that as with many other P2P type networks, the role of particular nodes may change. For example, a particular node may act as the client 210 in one particular streaming session, while acting as a serving peer 220 in another session. Further, particular nodes can simultaneously act as both client nodes 210 and servers 200 or serving peers 220 to simultaneously stream one or more media files, or portions of media files, while receiving other streaming media from one or more other serving peers.

During a streaming session, the client 200 first locates a number of close-by peers 220 that hold some or all of the desired media, and then streams the media from the multiple peers (which may include the server 200). Consequently, each serving peer 220 acts to assist the server 200 by reducing the overall upload burden by servicing a portion of the download request of the client 210. As a result, the client 210, especially in the case where there are many clients, can often receive much better streaming media quality, as there is a significantly higher serving bandwidth available when there are many streaming peers 220 to assist the server 200.

In general, the PeerStreamer system provides receiver-driven media streaming. PeerStreamer operations begin with each receiving client retrieving a list of nearby serving peers that hold all or part of the requested streaming media. Note that in this context, a media server can also act as one of the serving peers. This list includes the IP addresses and the listening ports of a set of one or more neighbor serving peers that hold a complete or partial copy of the serving media. Methods for retrieving this list include: 1) retrieving the list directly from the media server; 2) retrieving the list from a known serving peer; and 3) using a distributed hash table (DHT) approach for identifying the serving peers.

Once the client has retrieved the list of available serving peers, the client connects to each serving peer and obtains its "availability vector." In general, the availability vector for each serving peer is a compact description of the exact portion of the media held by each serving peer. This availability vector is then used by the client to determine exactly what blocks of the encoded media are held by the serving peer.

For example, where a particular serving peer holds the entire serving media the availability vector of that peer can be a single flag that indicates that the serving peer holds a complete media copy. Similarly, if the serving peer holds only a portion of the serving media, the availability vector of that serving peer will signal to the client what portion of the media is held by the serving peer, e.g., the number of blocks of each packet and the block indexes that are held by the serving peer.

Given the availability vector, the next step is for the client to retrieve the lengths of a "media header" and a "media structure" for the media to be streamed from the peer cluster. After these lengths have been retrieved, the client calculates "data unit IDs" of the media header and media structure, and retrieves them from one or more of the peers in the peer cluster based on the knowing what peer has what packets IDs as a result of having analyzed the availability vector for each serving peer.

Once the media header arrives, the client analyzes the media header, and then configures or initializes whatever audio/video decoders and rendering devices that are needed for decoding and rendering or playing back the specific type of media being streamed (i.e., MPEG 1/2/4, WMA, WMV, etc.) Once this initial setup phase has been completed, the client then proceeds to coordinate ongoing streaming of the media body from the peer cluster as described below. In particular, given the aforementioned media structure of the particular streaming media, the client calculates data unit IDs of packets of the streaming media, and then retrieves those packets one by one from the various peers.

The client then periodically updates the serving peer list (using one of the aforementioned methods for identifying serving peers), and connects to potential new serving peers. In a tested embodiment, the client checked for potential new serving peers by issuing periodic conventional TCP connect function calls for each potential serving peer. After the client establishes the connection to a new serving peer, it first retrieves the aforementioned availability vector. The new peer may then join the other active peers in the cluster, at the direction of the receiver/client. The client then coordinates the peers, balances the serving load of the peers according to their serving bandwidths and content availability, and redirects unfulfilled requests of disconnected or timed-out peers to one or more of the other active peers. The streaming operation then continues in this manner until the entire streaming media is received, or the streaming operation is stopped by the user.

It should be noted that although the random access read/write format is described in relation to the system and method described in the co-pending application Ser. No. 10/934,823, the invention is not limited to just this type of system. In general, the data format and DRM schemes of the invention can be used with any type of on-demand streaming system such as GnuStream, FriendShare, and so on.

3.0 Media Format in Peerstreaming.

The following paragraphs describe the traditional media format and contrast it with the random access read/write media technique and format of the invention.

3.1 Background: Traditional Media Format.

Figure 3:
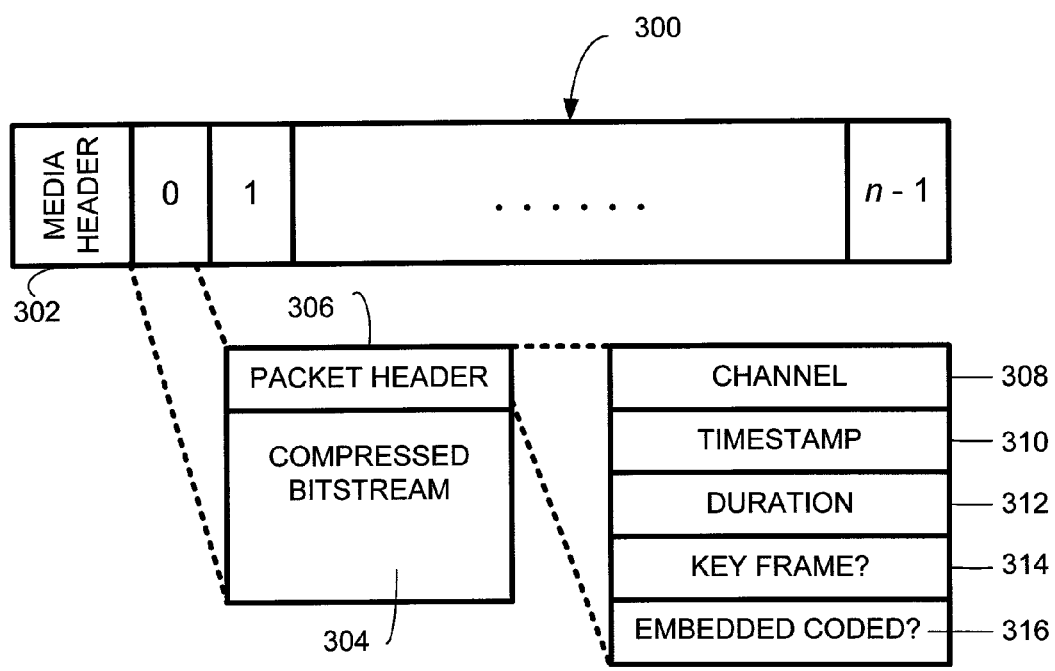
FIG. 3 provides a traditional file format of a streaming media file.

The traditional structure of a streaming media file 300, be it MPEG, AVI, Windows Media or Real, can be illustrated in FIG. 3. The media is led by a header 302, which contains global information of the media, e.g., the number of channels in the media, the property and characteristic (audio sampling rate, video resolution/frame rate) of each channel, codecs used, author/copyright holder of the media, and so forth. The media header 302 is usually downloaded before the start of the streaming session, so that the client may set up the necessary tools to decode and render the following packets. A streaming media may consist of several channels, each of which is a media component that can be independently selected and decoded, e.g., an English audio track, a Spanish audio track, a 4:3 video, a 16:9 video. The header 302 is followed by a sequence of media packets, each of which contains the compressed bitstream 304 of a certain channel spanning across a short time period. Each media packet is led by a packet header 306, which contains information such as the channel index 308, the beginning timestamp of the packet 310, the duration of the packet 312, as well as a number of flags 314, e.g., whether the packet is a key frame (a MPEG I frame). The compressed bitstream of the packet is then attached after the packet header.

3.2 Random Access Read/Write File Format.

The random access read/write format of the present invention further extends the traditional media format described above. The extension lies primarily in three areas: 1) to support scalable compressed media, 2) to support non-sequential, on demand media reading and writing, and 3) to support simplified communication between the client and the serving peer.

As discussed above and in co-pending application Ser. No. 10/934,823, in the PeerStreaming architecture, as well as in other P2P and on demand streaming applications, the user is allowed to watch the media in a non-sequential manner. As a result, the media file format must accommodate the arriving of media packets in such a sequence, and writing the arriving non-sequential media packets into the file. Moreover, when the node becomes a serving peer, it needs to respond to the on-demand request so that it can quickly locate and read the media packets accessed.

Figure 4:
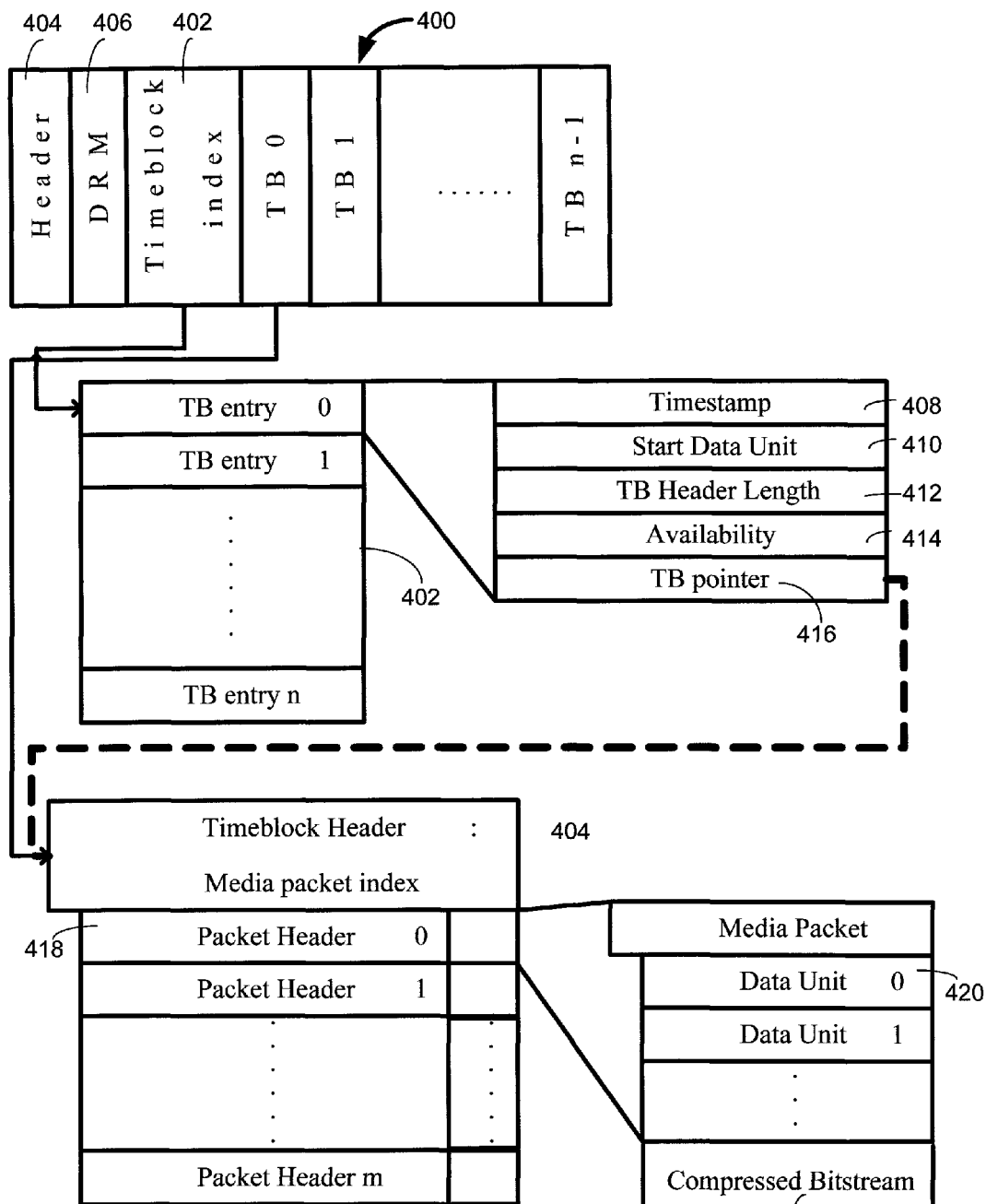
FIG. 4 illustrates an example of the random access read/write media file format of the invention.

One embodiment of the random access read/write format 400 of the present invention that can be used in the PeerStreaming architecture of the co-pending application, as well as other applications, is shown in FIG. 4. Compared with the traditional media file shown in FIG. 3, one notices that the random access read/write format of the invention adds one level of hierarchy above (the timeblock) and below (the data unit) the media packet. A two-level index hierarchy, the timeblock index table 402 and the media packet index table 404 in the timeblock header, eases the locating, reading and writing of non-sequential media packets. The random access read/write media format of the invention may also have, but does not require, a digital right management (DRM) header 406, whose content will be described in Section 4.0.

The data fields of this random access read/write format 400 of the present invention are shown in FIG. 4 and described in further detail below.

3.2.1 Timeblock.

As shown in FIG. 4, the timeblock is an additional level of hierarchy added on top of the media packet. The media file is split into a number of timeblocks, each of which consists of media packets of a short non-overlapping time span, for example 1s. Because most advanced video codecs use group of picture (GOP) structure, and usually a video can only be played from the beginning I frame of each GOP, ideally, the timeblock should preferably be aligned with the boundaries of the video GOPs. The timeblock is the atom of writing media packets. In the exemplary system architecture discussed above and in the aforementioned co-pending patent application, the PeerStreaming client only writes out the timeblock after the entire timeblock has been received and rendered. Note that this does not necessary means all media packets in a timeblock have been received. It just indicates that the entire timeblock has been processed by the receiver. Certain media packet may not be retrieved (e.g., in a language track not requested by the client, a low priority media packet or a enhancement layer segment of the media packet in a scalable media.)

An index table 402 of all the timeblocks preferably follows right after the media header 404 and the DRM header 406 (if used). Each entry of the timeblock index table 402 consists of the beginning timestamp of the timeblock 408, the beginning of the data unit index 410 (to be explained in Section 3.2.2), the length of the timeblock header 412, an availability tag 414, and a timeblock data pointer 416. The timeblock index table 402 helps an on demand streaming system to quickly locate the timeblock and its media packets: the timestamp provides the capability to locate them through media playback time, the data unit index provides the capability of retrieval via data unit ID. The availability tag 414 provides information on how complete the timeblock is: whether the timeblock is partial because the user starts or stops the streaming in the middle of the timeblock, or because the user only retrieves certain channels, or because the user retrieves only the high priority media packets and/or the base layer of the truncatable media packets. The timeblock data pointer 416 points out the location and the length of the timeblock data that is stored in the media file (An alternative solution is to let each timeblock be an independent file. The pro of this alternative is that defragmenting non-sequential timeblocks becomes the burden of the operation system. It is also easier to update the content of the timeblock. The con of this alternative is that a long movie may consist of several thousand timeblocks, which lead to several thousand files. This may put unnecessary burden to the file system). If a certain timeblock has not been received yet, the data pointer will be empty.

Each timeblock is led by a timeblock header 404, which consists of a table of index of the media packets. The table entry contains the media packet header 418 (channel index, beginning timestamp, property flags, the original media packet length), and a pointer 420 to the media packet data. For truncatable media packet, a list of truncation points with length and (optionally) the associated priority value is also attached. We define the content before the 1$^{st}$ truncation point as the base layer of the media packet, and define the content after the 1$^{st}$ truncation point as the enhancement layers of the media packet. If a particular media packet does not exist, the pointer will be empty. The bitstream of the compressed media packets 422 then follows. The timeblock header enables the P2P system to quickly locate a media packet within the timeblock.

The timeblock index table 402 and the media packet index table 404 at each timeblock header form a two-level index table. Once retrieved, it enables the client to gain a bird's eye view of the entire media, so that it can plan the on demand P2P streaming intelligently. There are three categories of information in the timeblock and media packet index table. The first category is the media structure information. This includes the beginning timestamp, the beginning data unit index, the timeblock header length in the timeblock index table, and the media packet index table in the timeblock header. The media structure information is the same across all peers holding the media, even for peer that holds only a partial or a scaled-down copy of the media. As a result, it only needs to be retrieved once, and may be retrieved in a distributed fashion from multiple peers. The second category is the availability indicator or vector. It describes whether a particular timeblock/media packet is held by a certain peer. For scalable media in a truncatable packet mode, it may further describe how much the packet is available from a certain peer. The availability indicator or vector is unique for each serving peer and needs to be retrieved individually. The third category is the data pointers, such as the timeblock pointer and the media packet pointer. The data pointers do not need to be sent over the network.

3.2.2 Data Unit.

The peer streaming system described above and in co-pending application Ser. No. 10/934,823 breaks the data to be transmitted, including the media header, the DRM header (if used), the timeblock index table, the timeblock header, and the body of the media packets into data units of maximum size L. There are three reasons of using fixed size data units. First, the PeerStreaming client and the serving peer may pre-allocate memory block of size L, thus avoid the costly memory allocation operation during the receiving and serving process. Second, the data unit enables all media content to be mapped into a data unit ID space. And with a fixed maximum size, we may automatically calculate the IDs of the constituent data units of the media/DRM header, and the body of the media packet through the length of the media/DRM header, and the length of the media packet body. Say we know a certain content (media/DRM header, media packet header in the timeblock, media packet body) has a known length S, and its beginning data unit ID is B, the content will be split into $\lceil S/L \rceil$ data units, where $\lceil x \rceil$ is the ceiling function that returns the smallest integer larger than or equal to x. We easily derive that the constituent data units of the content has IDs from B to $B+\lceil S/L \rceil -1$. Thus, the request to retrieve information, whether it is the header or the body of the media packet, becomes the request to retrieve the data unit with certain ID. This greatly simplifies the communication protocol between the peer and the client. A sample mapping between the media file and the data unit ID is provided in Table 1. The third reason for using a fixed size data unit is that splitting all information into smaller data units allows the client to retrieve the information in a distributed fashion. Each individual data unit may still be retrieved from a single serving peer. Nevertheless, by retrieving the underlying data units of a media component from different serving peers, and by assigning more data units to the serving peer with high upload bandwidth, and fewer data units to the serving peer with low upload bandwidth, the client can retrieve every information, including the media and the DRM header, the media structure, and the media packet body in a distributed fashion.

TABLE 1

Mapping between the content and the data unit.

| Data Unit ID | Content |
| --- | --- |
| 0x00000000 | Length of the media header, the DRM header & the timeblock index table |
| 0x00000100-0x000001ff | Media header |
| 0x00000200-0x000002ff | DRM header |
| 0x00000300-0x000003ff | Timeblock availability vector |
| 0x00000400-0x0000ffff | Timeblock index table |
| 0x**0000-0xffff | Body of a certain timeblock** |
| 0x**0000-0x**00ff | Media packet availability vector in the timeblock |
| 0x**0100-0x**01ff | Media packet header in the timeblock |
| 0x**0200-0x**ffff | Media packet body |

3.2.3 Media Streaming Using the Random Access Read/Write Format.

In the following paragraphs an exemplary embodiment of on demand streaming media using the random access read/write format of the invention will be described.

Figure 5:
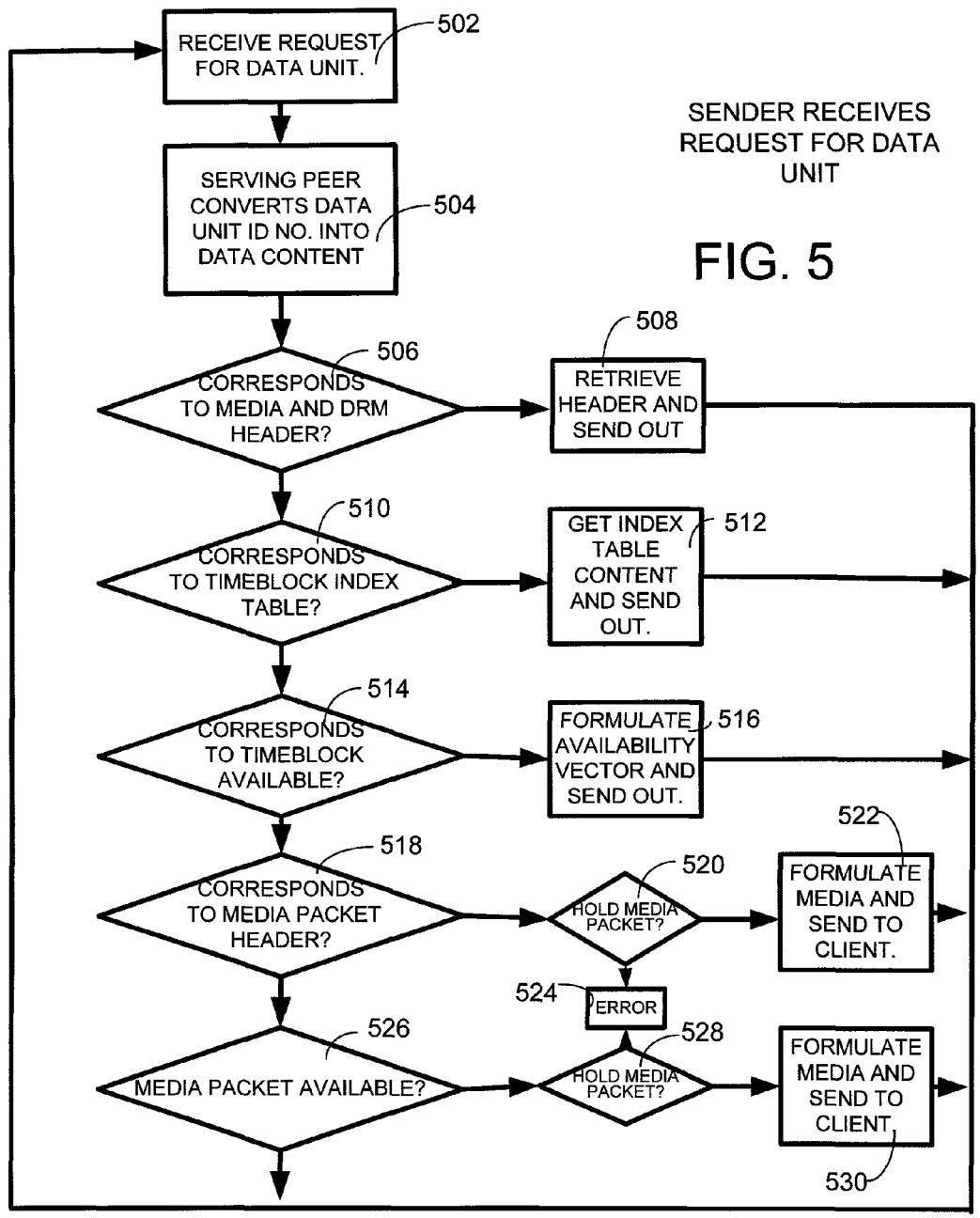
FIG. 5 provides an exemplary flow diagram of the processing of a data request using the random access read/write media file format of the invention.

FIG. 5 shows a flow diagram of the processing of the server or serving peer upon receipt of a data request from another node on the network. As shown in process action 502, the server or serving peer receives a request for a data unit identified by a data unit identifier (ID). The server or serving peer then converts the data unit ID into data content (process action 504) and checks if the data content corresponds to a media header or DRM header (process action 506). If so, the server or serving peer retrieves the media header or DRM header and sends it to the requesting party (process action 508). The server or serving peer then checks if the data unit content corresponds to the timeblock index table (process action 510) and if so looks up the timeblock index and sends it to the requesting party (process actions 512). Then the server or serving peer determines if the request relates to timeblock availability (process action 514). If so, the server or serving peer formulates an availability indicator (e.g., an availability vector) and sends it out (process action 516). The server or serving peer then checks to see if the request relates to a media packet header (process action 518). If so, the server or serving peer checks if it holds the media packet (process action 520) and if so, it formulates the media packet header and sends it to the requestor (process action 522). If it does not hold the media packet the server or serving peer terminates the processing for this request (process action 524). Finally, the server or serving peer checks to see if the data request relates to a media packet (process action 526). If so, it checks to see if it holds the media packet (process action 528) and sends it to the requestor (process action 530). If it does not hold the media packet the server or serving peer terminates the processing for this request (process action 524). The server or serving peer then waits for the next request and processes the request as described above.

Figure 6:
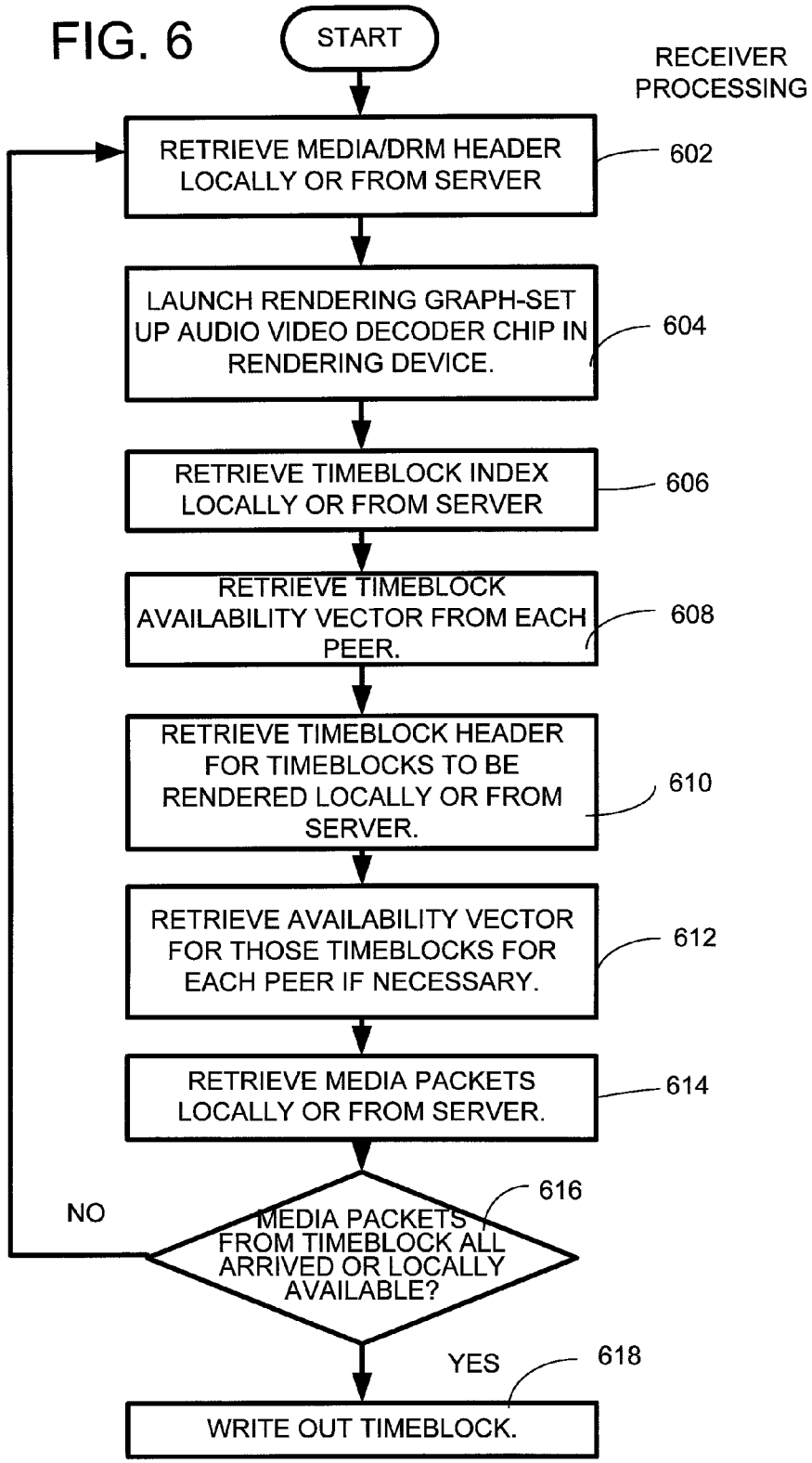
FIG. 6 provides an exemplary flow diagram of receiving and accessing media data using the random access read/write media file format of the invention.

FIG. 6 shows the user or receiver processing employing the random access read/write format of the invention. As shown in process action 602, the user retrieves the media or DRM header locally from its hard drive (if it has retrieved partial media before) or from peer nodes or from a server and launches the rendering device and sets up the audio video decoder in the rendering device (process action 604). The receiver then retrieves the timeblock index table either locally or from the server (process action 606). The receiver then retrieves the timeblock availability vector from each peer (process action 608). The timeblock header for timeblocks to be rendered either locally or from the server are also retrieved (process action 610). The receiver may also retrieve the availability indicator (e.g., availability vector) for the desired timeblocks for each peer if necessary (process action 612). The required media packets are then retrieved locally or from the server (process action 614). Because the timeblock is the atom of writing media packets, the receiver performs a check to see if all media packets of a certain timeblock have arrived or are locally available (process action 616). If so, the receiver writes out the timeblock (process action 618), update the availability information in the timeblock header, otherwise the receiver repeats process actions 602 through 616 until all media packets have been received.

4.0 Digital Rights Management.

The following paragraphs discuss the Digital Rights Management schemes according to the invention.

4.1 DRM Background.

Figure 7:
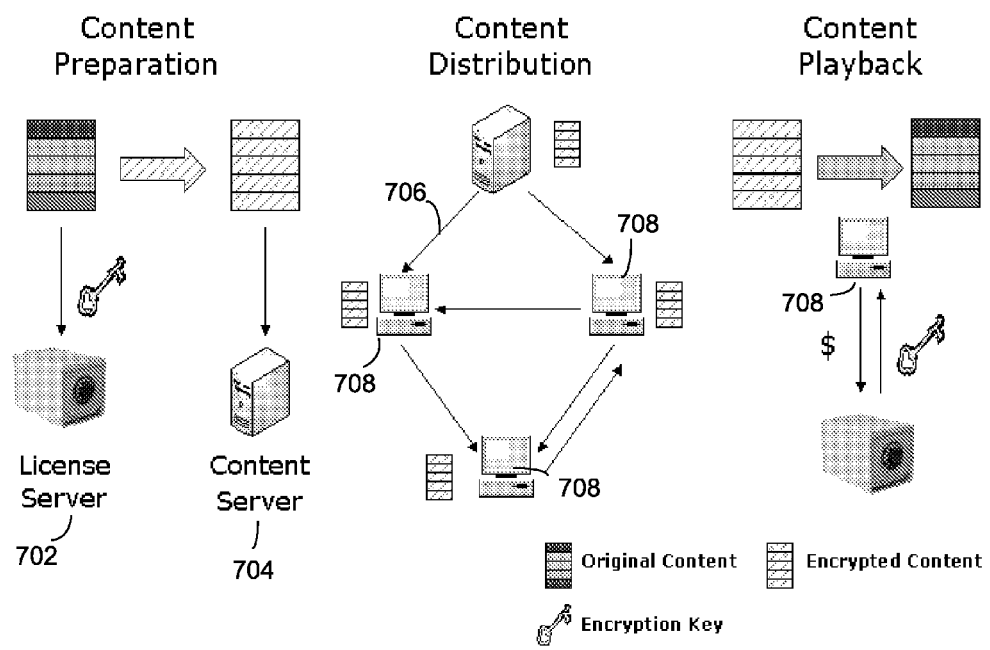
FIG. 7 illustrates an exemplary system employing one embodiment of a DRM scheme according to the invention.

The concept of Digital Rights Management (DRM) was first proposed to protect software copyright. Recently, it has been extended to prevent illegal consumption of digital media. An exemplary system that employs one embodiment of a DRM technique of the present invention is illustrated in FIG. 7. The media is encrypted, with the decryption key being maintained by a license server 702 authorized by the content owner. Only the encrypted copy of the media is stored on the media or content server 704, distributed in a network 706, and cached on the peer nodes 708 for serving. Every time the user (e.g., peer node 708) plays the media, the system checks if a license, which contains the decryption key and the terms of using the decryption key, is available that authorizes the use of the media. The term of usage can be in the form of time (expiration date), the number of allowable usage, or certain other terms. If not, the user 708 must first obtain the license from the perspective license server 702. The license ensures that the content owner is aware of the media distribution and is just compensated. The license also ensures that the client may readily use the media according to the granted term. By granting a long term or multiple usage license, the client does not need to obtain authorization from the license server every time it uses the media.

A flow chart of this DRM process is shown in FIG. 8. As shown in process action 802, the media content is encrypted by a license server. The license server then provides only the encrypted content to a content server that distributes the encrypted content to one or more peers in a network, who may also distribute the content in a distributed fashion (process action 804). Note that the media structure information is left in the clear, and is not encrypted. Therefore, the peers may efficiently distribute the media in a peer-to-peer environment without the decryption key. Every time a user (e.g., one of the peers) plays the media, a check is made by a DRM manager resident on the user's computer to see whether a license, which contains the decryption key and the terms of using the decryption key, is available (process action 806). If the client has authorization he can play or use the media (process actions 808 and 810). If not, the user must first obtain the license from the perspective license server (process action 812) to play the media (process action 810). If no license/authorization is obtained then the user cannot decrypt or access the media.

The DRM scheme of the present invention when employed in an on-demand streaming system becomes an efficient way for the content owner to distribute the media content without relinquishing control of the content. Without the license, the peers may still distribute the media. However, the media cannot be played. The details of this DRM scheme are described below.

4.2 DRM Protected Media.

In one embodiment of the invention, each DRM protected media has an additional DRM header 406, which is preferably placed right after the media header, as shown in FIG. 4. The DRM header 406 contains a URL that points to the license server of the media, and a media ID that uniquely identifies the media.

Figure 9A:
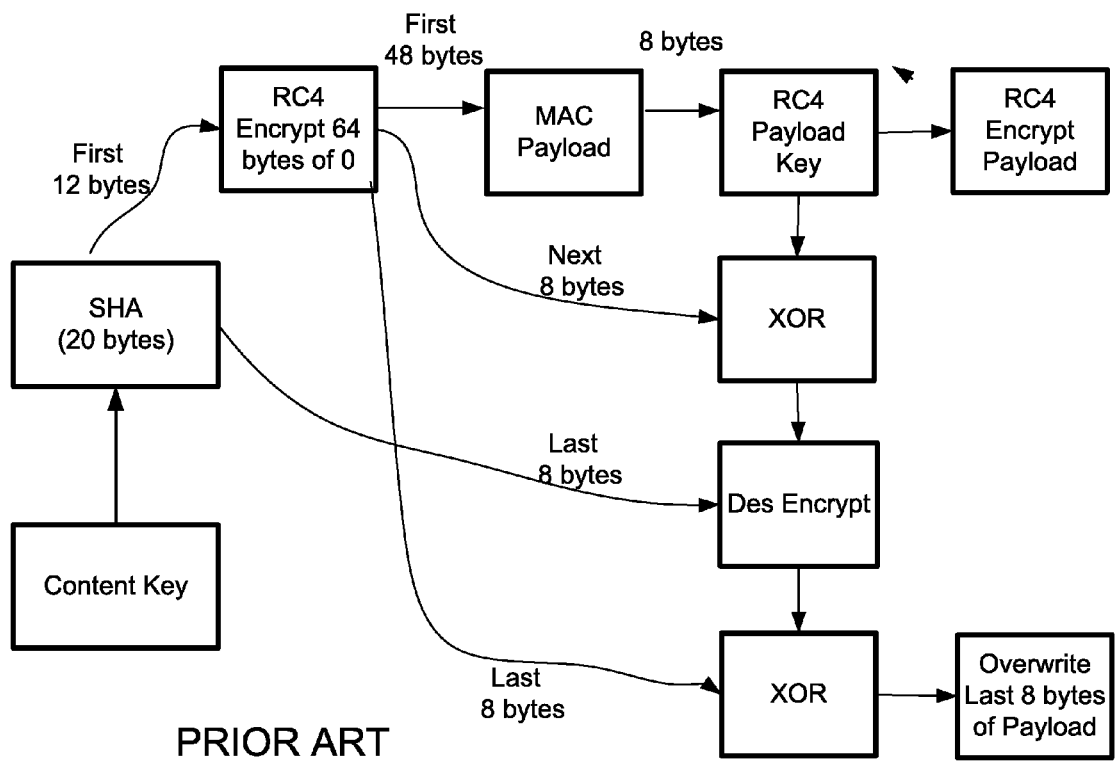
FIGS. 9A and 9B illustrate a conventional procedure for encrypting and decrypting media so that the encryption key becomes part of the encrypted content.

The DRM protected media is encrypted prior to distribution. Only the compressed bitstream of the media packet is encrypted. The media structure information and the availability vector are all in clear text. This enables all peers to parse the media, to efficiently distribute and serve the media. However, only the client with the authorization from the license server can play the media. To minimize the chance that the content may be cracked, a different key is generated for each packet by combining the packet content and the original encryption key through a hashing function. In one embodiment, a clever way is employed so that the key becomes part of encrypted content, and we do not need extra space to store the encryption key for each packet. A conventional procedure to encrypt a packet, as shown in FIG. 9A, is as follows:

1. A content key is generated so that the content key will also be included in the license and encrypted with the user's public key.
2. The content key is hashed using a SHA (Secure hash algorithm) obtaining a 20 byte result.
3. The first 12 bytes are designated as the RC4 (a streaming cipher for RSA data security) key. The last 8 bytes is the DES (data encryption standard) key.
4. The RC4 key is used to encrypt 64 bytes of zeroes. This has the effect of getting a 64 byte RC4 key. The first 48 bytes of the result are used as a MAC (message authentication code) key.
5. MAC is run over the data in the packet, using the MAC key, to produce an 8 byte result which is the RC4 content data encryption key.
6. RC4 is used to encrypt the data in the packet (less the last 0 to 7 bytes), using the key obtained in the previous step.
7. From the 64 bytes obtained in step 4, the 8 bytes following the 48 bytes MAC key are used to XOR the RC4 content key obtained in step 5.
8. The DES key is used to encrypt the XOR'd RC4 content key from step 7
9. From the 64 bytes obtained in step 4, the last 8 bytes are used to XOR with the result of the DES encryption in step 8.
10. The resulting 8 bytes are inserted into the packet (last 8 to 15-7 bytes) overwriting the actual content.
11. The remaining 0 to 7 bytes of content are left in the clear.

Figure 9B:
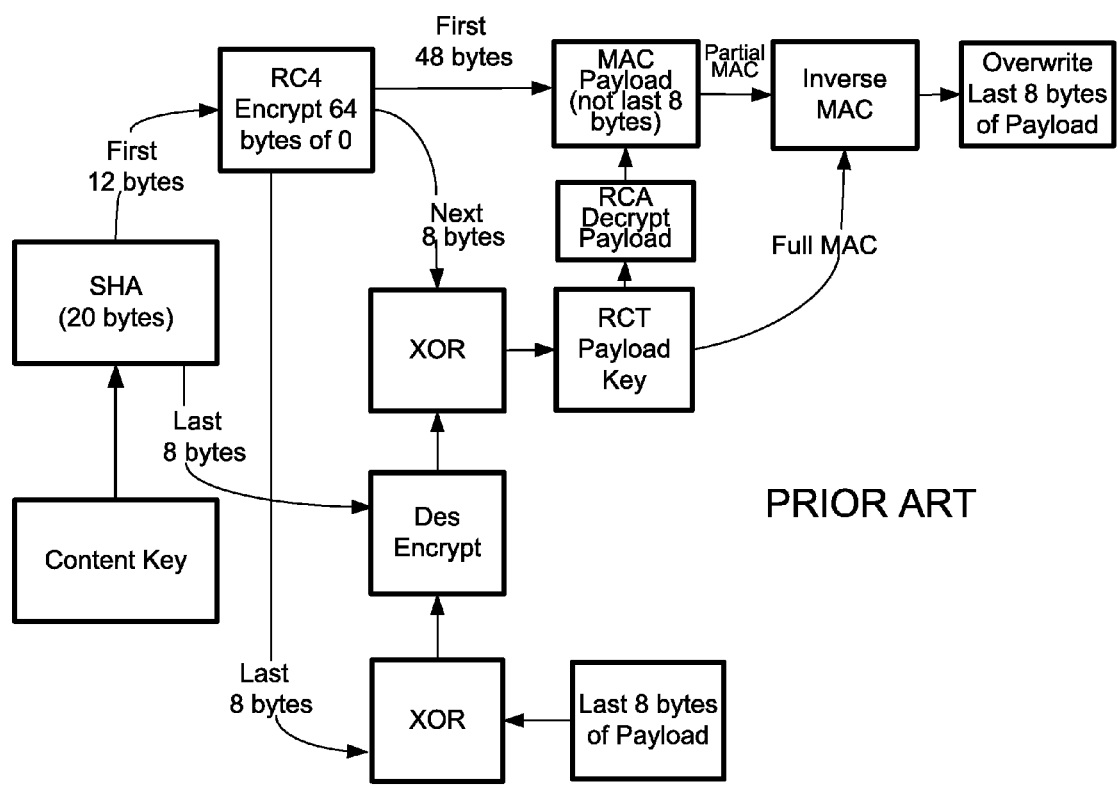

To decrypt the packet, the following conventional procedure, shown in FIG. 9B, is used:

1. The encrypted content key in the license is decrypted with the machine's private key.
2. The content key is hashed using SHA obtaining a 20 bytes result.
3. The first 12 bytes are the RC4 key. The last 8 bytes is the DES key.
4. The last 0-7 bytes are ignored they are clear content.
5. The RC4 key is used to encrypt 64 bytes of zeroes.
6. The last 8 bytes from the result of step 5 is used to XOR the last 8 bytes (right before the clear content).
7. The DES key is used to decrypt the 8 bytes resulting from the XOR in step 8. The result is the XOR'd RC4 content encryption key for the payload.
8. The 8 bytes following the 48 bytes are used as the MAC key in step 6 to XOR the 8 bytes resulting from the DES decryption in step 9. The result is the RC4 content key for the packet.
9. The RC4 key is used to decrypt the content of the packet.
10. The first 48 bytes from the result of step 5 are used as a MAC key.
11. MAC is used on the entire packet, then MAC is used over the payload portion of the packet (without the 8 bytes where the key is stored) using the MAC key to regenerate the 8 bytes of content overwritten by the packet key.
12. All clear content pieces are appended together—the decrypted packet, the regenerated 8 bytes at the end and the eventual remaining 0 to 7 bytes of clear content.

The key step in the above procedure is that at the time of the encryption, we derive the encryption/decryption key of the packet via MACed content of the packet. The key then replaces an equal portion of the content in the encrypted packet. The key is encrypted by the master key of the media (via DES). At the time of the decryption, we first decrypt the packet key by the master key of the media. Using the packet key, we decrypt the rest of the media packet not replaced by the key. Then the MAC is used on the entire packet to regenerate the content overwritten by the key.

As we can see, each packet is encrypted with a unique key generated through the MAC of the packet. Since the recovering of the encryption key of a single packet does not automatically recover the keys of the rest of the media packets, it is plausible to choose a relatively low-complexity algorithm to encrypt/decrypt the individual media packet. Moreover, since different media packets are encrypted with different keys, the master encryption key is less exposed, and is less likely to be cracked. In one exemplary embodiment RC4, a widely used symmetric key algorithm with linear encryption/decryption complexity, was chosen. The key size is selected to be 8 bytes.

4.3 DRM Manager: License Management and Decryption

In order to play back the protected media, the user must contact the license server to obtain a license. A DRM manager is implemented in the system to delegate the license acquisition task. To purchase the key, the DRM manager sends a request to the license server with the user's personal information (e.g., name, credit card number if payment is required) attached. After the proper authentication and purchasing transaction, the license server sends a license back to the DRM manager. In order to defeat any interception effort and to discourage the user to hack into and modify the license file, the license server further encrypts the license with a public key generated by the DRM manager. During the media playback, the DRM manager may decrypt the license to obtain the decryption key and examine the term of usage. Nevertheless, it does not store the decryption key in the hard disk.

Besides the license management task, the DRM manager is also responsible to decrypt the incoming media packet using the acquired decryption key. Once decrypted, the clear packet is fed into the audio/video decoder. To deter piracy, the DRM manager also makes sure that the clear packet is fed into the decoder, rather than stored in a local file. After playback, the clear text media packet is immediately removed from the memory. The media packets cached by each peer are still the encrypted packets.

The license acquisition operation of the DRM manager is controlled by the end user through a specific user interface. Since playing the protected media may require compensation, the user must give explicit consent and/or payment in order to secure a license. If the user declines to acquire the license, the media playback function will be disabled. The Peer Streaming system can still receive, cache and serve the media. But it cannot playback the media content. Nevertheless, if the user decides to acquire the license at a later time, he/she may be able to play locally cached media instantly.

4.4 Hierarchical DRM.

Figure 10:
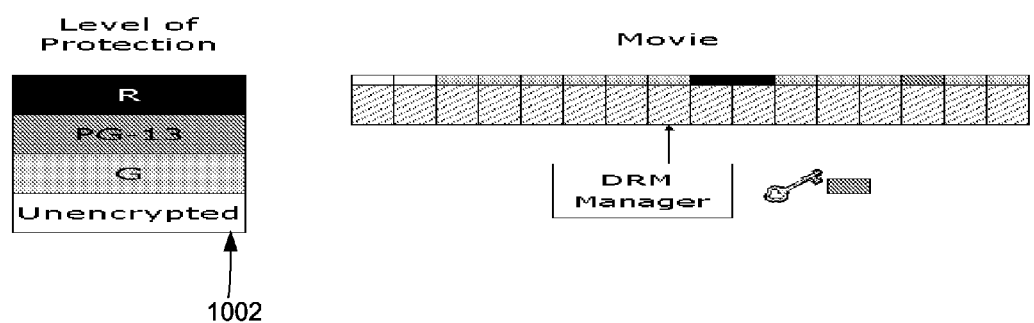
FIG. 10 illustrates an example of a hierarchical DRM scheme according to the invention.

Since DRM operates at the packet level, it is possible to achieve digital content protection in a fine granularity. One example is parental control. As shown in FIG. 10, one can associate each packet of the movie with a different access or protection level 1002. The majority of the movie may be of level "G", and may be watched by everyone. However, certain portion of the movie may be of level "R", and may be only watched by adults. Different users of a family may have different licenses assigning them with different level of content assessment right. Another example of the hierarchical DRM is to assign different access or protection level for different quality of media (e.g., DVD vs. HDTV). The user may need to pay extra to secure high quality media. The third example is that the content owner may choose to leave certain portion of the movie (e.g., the first 15 minutes) unencrypted to attract the users, and keep the rest of the movie encrypted.

In the hierarchical DRM, there is usually an order of the protection layer. As a result, one may let the decryption key of a lower protection layer be the hash of the decryption key of a higher protection layer. That way, the user granted with the access to the high protection layer may simply hold a single license of that layer, and obtain all decryption keys of that layer and below. This simplifies the task of the DRM manager in hierarchical DRM implementation. During the media playback, the DRM manager only decrypts those packets with the protection levels equal to or below the access level of the current user, and jumps over the packets that cannot be decrypted. Depending on whether the unplayable media packets will be used by the other users on the same machine, they may or may not be retrieved by the client.

4.4 Scalable DRM.

For scalable media with truncatable media packet, a slight change was made in the DRM encryption/decryption scheme in the system and method of the invention. The change is, in step 5 of the encryption, the MAC is run over the data in the base layer of the packet. The MAC of the base layer of the payload produces an 8 byte result which is the RC4 content data encryption key for the base layer and the enhancement layer of the packet. At the time of the decryption, we first use the decryption procedure to recover the base layer of the packet. Then, the recovered 8 byte RC4 content data encryption key is further used to decrypt the enhancement layer of the packet. This way, we may encrypt/decrypt truncatable media packet with unique keys for each media packet, as long as the base layer of the packet is preserved in the truncation.

The foregoing descriptions of the random access read/write format and technique and DRM techniques have been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments. It is intended that the scope of the invention be limited not by this detailed description, but rather by the claims appended hereto.

What is claimed is:

1. A process for managing digital rights to media, comprising the process actions of:
  in a media file comprised of media packets, for each packet designating one of a set of predetermined hierarchical access levels ordered from lowest to highest, wherein each media packet is encrypted with a different encryption key derived via a message authentication code (MAC) applied to the packet;
  assigning to a user an access level from said set of hierarchical access levels; and
  granting access to a user to media packets that are designated with his hierarchical access level and below.

2. The process of claim 1 wherein the predetermined access levels relate to movie ratings.

3. The process of claim 1 wherein the predetermined access levels relate to media quality.

4. The process of claim 1 wherein each media packet is encrypted/decrypted with a separate key based on its hierarchical access level.

5. The process of claim 4 wherein the decryption key of each lower access level is the hash of the decryption key of the higher access level.

6. The process of claim 5 wherein when a user is granted access to the decryption key of a higher access level may automatically generate the decryption keys of that level and below.

7. The process of claim 1 wherein the predetermined access levels relates to the ability to access only a portion of the media packets in the media file.

* * * * *